United States Patent
Won

(10) Patent No.: US 8,225,632 B2
(45) Date of Patent: Jul. 24, 2012

(54) KEY INTERLOCK DEVICE FOR VEHICLE

(75) Inventor: Dohyon Won, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 113 days.

(21) Appl. No.: 12/818,932

(22) Filed: Jun. 18, 2010

(65) Prior Publication Data

US 2011/0126599 A1 Jun. 2, 2011

(30) Foreign Application Priority Data

Dec. 1, 2009 (KR) ........................ 10-2009-0118005

(51) Int. Cl.
*B60R 25/06* (2006.01)

(52) U.S. Cl. ........................ 70/247; 477/99; 74/473.21

(58) Field of Classification Search ................... 70/245, 70/247, 248, 252, 254; 447/94, 96, 99; 74/473.21
See application file for complete search history.

(56) References Cited

U.S. PATENT DOCUMENTS

| | | | | |
|---|---|---|---|---|
| 4,967,883 A | * | 11/1990 | Kito et al. | 70/245 |
| 5,085,096 A | * | 2/1992 | Behrens | 74/473.23 |
| 5,657,654 A | * | 8/1997 | Hoebel | 70/247 |
| 5,662,001 A | * | 9/1997 | Smale | 74/483 R |
| 5,857,938 A | * | 1/1999 | Porter | 477/99 |
| 5,860,303 A | * | 1/1999 | Droz et al. | 70/247 |
| 5,913,909 A | * | 6/1999 | Schwab | 70/247 |
| 6,176,809 B1 | * | 1/2001 | Visser et al. | 477/99 |
| 6,427,503 B2 | * | 8/2002 | Kataumi et al. | 70/247 |
| 6,439,014 B1 | * | 8/2002 | Syamoto | 70/247 |
| 8,075,446 B2 | * | 12/2011 | Jeong | 477/99 |
| 2001/0013237 A1 | * | 8/2001 | Kataumi et al. | 70/247 |
| 2003/0097897 A1 | * | 5/2003 | Yamada et al. | 74/473.21 |

FOREIGN PATENT DOCUMENTS

| | | |
|---|---|---|
| JP | 9-156394 A | 6/1997 |
| JP | 2001-18675 A | 1/2001 |
| JP | 2004-130915 A | 4/2004 |
| JP | 2008-100542 A | 5/2008 |
| JP | 10-0925933 B1 | 11/2009 |
| KR | 10-2004-0006914 A | 1/2004 |
| KR | 10-0460894 B1 | 12/2004 |
| KR | 10-0489398 B1 | 5/2005 |
| KR | 10-0918080 B1 | 9/2009 |

* cited by examiner

*Primary Examiner* — Suzanne Barrett

(74) *Attorney, Agent, or Firm* — Morgan, Lewis & Bockius LLP

(57) ABSTRACT

A key interlock device for a vehicle, may include a shift lever moving straight at least in two perpendicular directions between a predetermined range and a P-range in sequence, a key lock lever pivotally coupled to a vehicle body and rotatable by a second straight movement of the shift lever between the predetermined range and the P-range, and a motion transmitting member coupled to an end portion of the key lock lever and transmitting the rotation of the key lock lever to a key set as a straight motion while the other end portion of the key lock lever moves in the second straight movement from/to the P-range of the shift lever by the shift lever.

1 Claim, 6 Drawing Sheets

KEY INTERLOCK DEVICE FOR VEHICLE

CROSS-REFERENCE TO RELATED APPLICATIONS

The present application claims priority to Korean Patent Application Number 10-2009-0118005 filed Dec. 1, 2009, the entire contents of which application is incorporated herein for all purposes by this reference.

BACKGROUND OF THE INVENTION

1. Field of the Invention

The present invention relates to a key interlock device for a vehicle, in more detail a technology about a mechanism implementing a key interlock function in accordance with operation of a shift lever.

2. Description of Related Art

Key interlock devices of vehicles are safety devices allowing the key to be removed from the key set only when the shift lever is positioned at the P-range, and the shift lever to move to the R-, N-, and D-ranges, at which the vehicles can be driven, only when the key is inserted in the key set and then turned to ON.

Key interlock devices of the related art uses mechanism restricting movement of the shift lever and the key set, by using an electric switch detecting the movement of the shift lever and the key set and a controller controlling the solenoid actuator.

This mechanism, however, has a problem in that many parts are required, including the electric switch, controller, and solenoid actuator, such that it is difficult to expect high reliability in operation and the cost is high.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a key interlock device for a vehicle having significantly improved operational reliability by implementing a mechanical key interlock function in accordance with the status of a shift lever and a key set, with a simple configuration and low cost.

In an aspect of the present invention, the key interlock device for a vehicle, may include a shift lever moving straight at least in two perpendicular directions between a predetermined range and a P-range in sequence, a key lock lever pivotally coupled to a vehicle body and rotatable by a second straight movement of the shift lever between the predetermined range and the P-range, and a motion transmitting member coupled to an end portion of the key lock lever and transmitting the rotation of the key lock lever to a key set as a straight motion while the other end portion of the key lock lever moves in the second straight movement from/to the P-range of the shift lever by the shift lever.

The key lock lever may have a rotational axis disposed in parallel with the direction of the second straight movement, wherein a driving protrusion formed on the other end portion of the key lock lever protrudes toward the shift lever along the direction of a first straight movement of the shift lever, and the shift lever has a guide in which the driving protrusion is inserted and coupled, the directions of the first and second straight movements being perpendicular each other.

An end portion of the driving protrusion of the key lock lever may be rounded, and the guide of the shift lever may be shaped of a groove formed to a shift block at an angle with respect to a longitudinal direction of the shift lever in the second straight movement such that the end portion of the driving protrusion is inserted into and rotatably coupled to the groove of the shift lever, the shift block being integrally formed with the shift lever.

An elastic member providing an elastic force pulling the driving protrusion of the key lock lever from the shift lever may be provided with the key lock lever.

The motion transmitting member may be a cable transmitting a pushing force actuated by the rotation of the key lock lever to the key set when the shift lever moves along the direction of the second straight movement.

The present invention provides a key interlock device for a vehicle having significantly improved operational reliability by implementing a mechanical key interlock function in accordance with the status of a shift lever and a key set, with a simple configuration and low cost.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
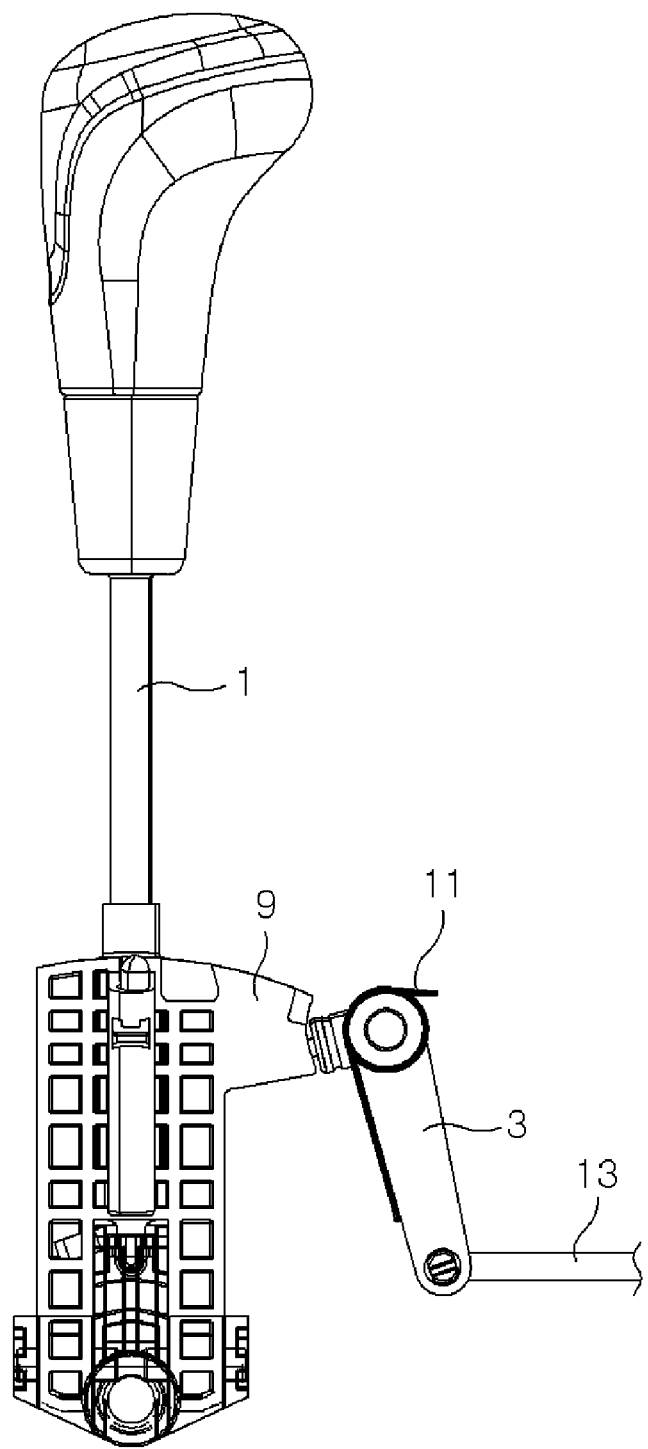
FIG. 1 is a view showing the main configuration of an exemplary key interlock device according to the present invention.
Figure 2:
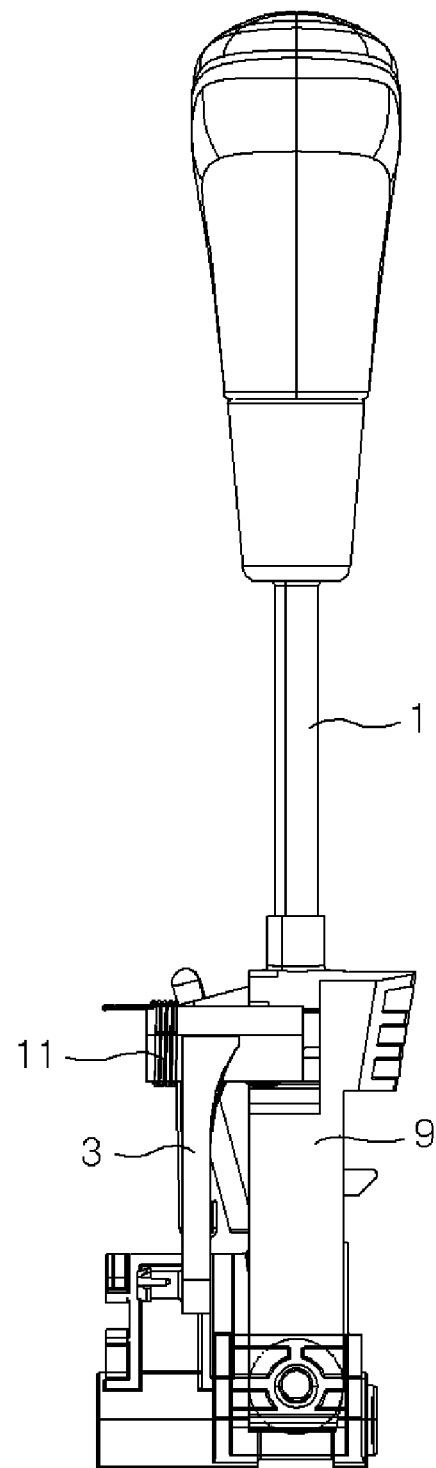
FIG. 2 is a right side view of FIG. 1.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIGS. 1 to 6, an exemplary embodiment of the present invention includes, a shift lever 1 moving straight at least in two perpendicular directions between a predetermined range and a P-range, a key lock lever 3 rotatable by straight movement of shift lever 1 between the range and the P-range, and a motion transmitting member transmitting the rotation of key lock lever 3 to a key set 15 as straight motion.

Figure 5:
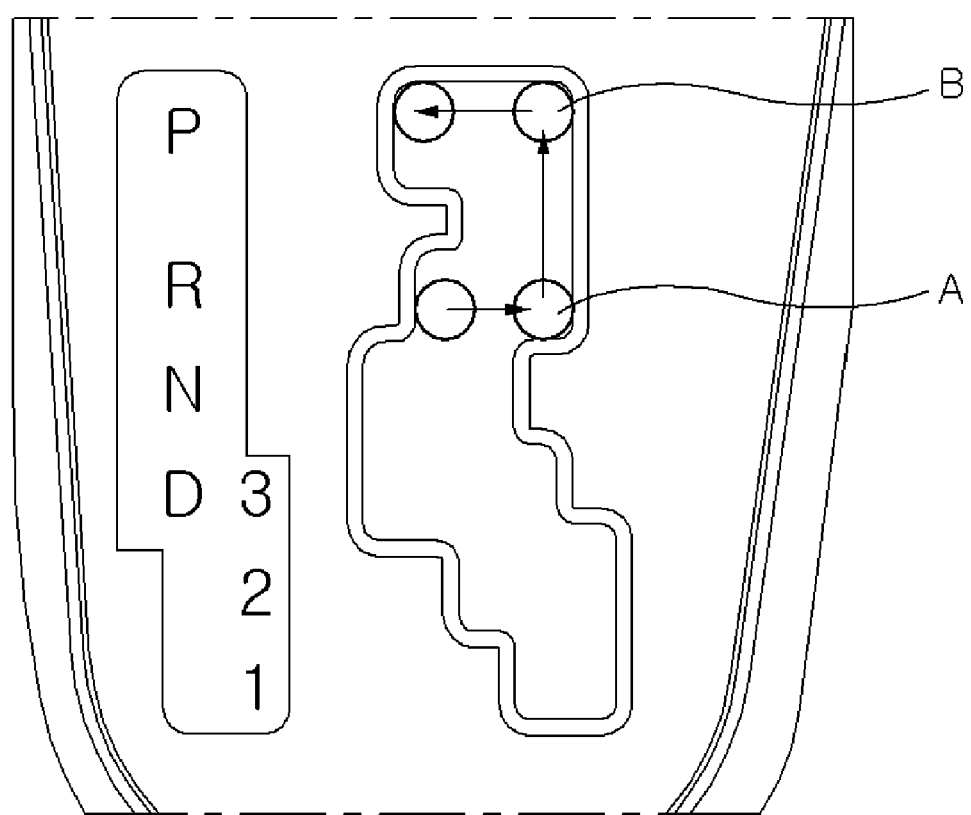
FIG. 5 is a view illustrating an example of a path of a shift lever moving in the gate, according to the present invention.

Shift lever 1 can be moved to the shift ranges through the path shown in FIG. 5.

In FIG. 5, the R-range is positioned closest to the P-range, shift lever 1 should be moved from the R-range to the P-range through the positions A and B in order to shift from the R-range to the P-range, and this movement is achieved by three movements perpendicular to each other. Therefore, the example shown in FIG. 5 illustrates when shift lever 1 moves between a predetermined range and the P-range while moving straight in two perpendicular directions, i.e., first and second straight movements.

The reason that the movement of shift lever 1 is straight is that shift lever 1 is guided straight by the gate as shown in FIG. 5, but shift lever 1 substantially makes the movement on the gate while rotating about a pivot point.

Figure 3:
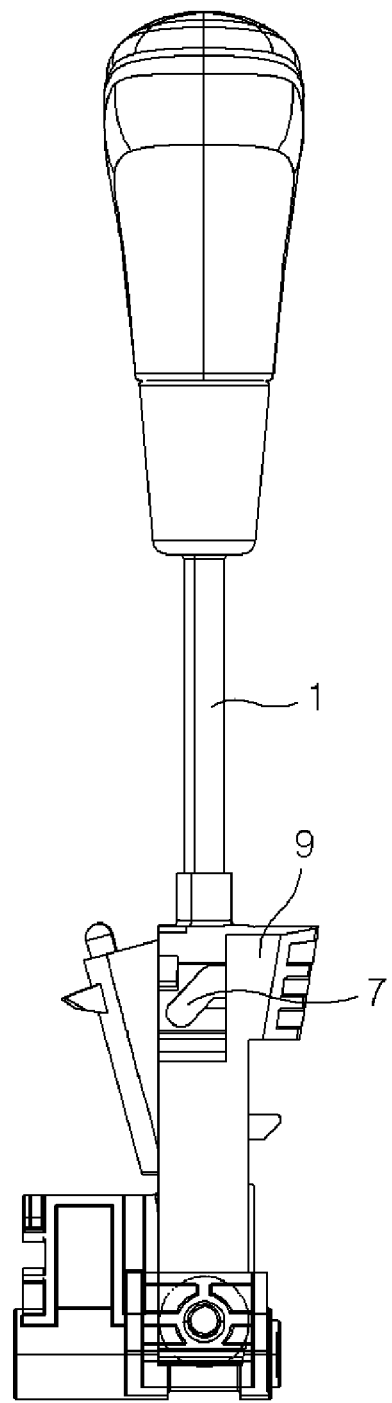
FIG. 3 is a view with an exemplary key lock lever removed in FIG. 2.
Figure 6:
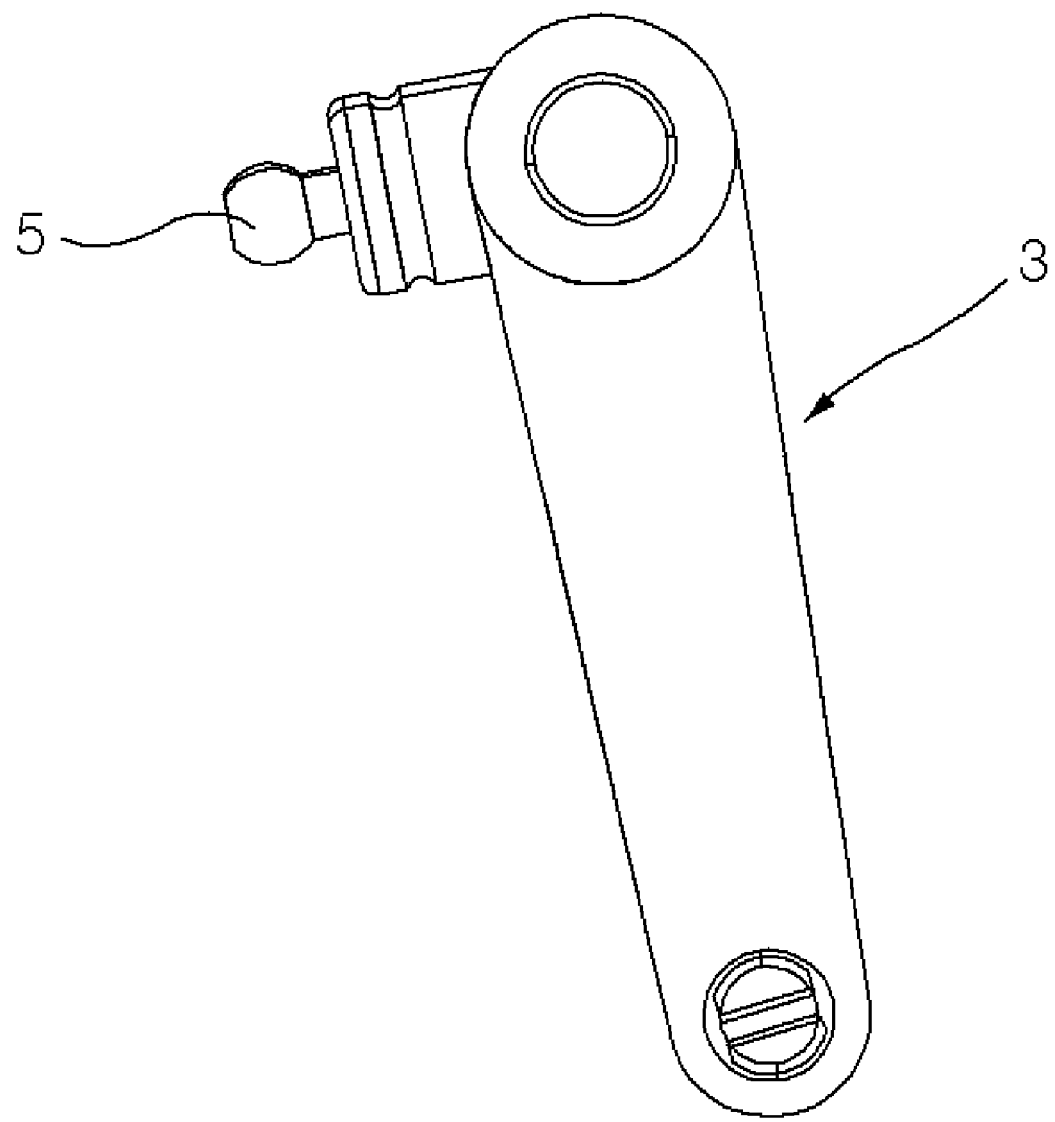
FIG. 6 is a view showing only the key lock lever of FIG. 1.

Key lock lever 3 has a rotational axis parallel with the direction of the second straight movement from/to the P-range of shift lever 1, a driving protrusion 5 protrudes toward shift lever 1 along the first straight direction, and shift lever 1 has a guide 7 in which driving protrusion 5 is inserted and coupled thereto as shown in FIGS. 3 and 6.

In other words, the rotational axis of key lock lever 3 is parallel with the second straight direction formed along a straight line connecting the P-range with the position B.

In the present exemplary embodiment, the end of driving protrusion 5 of key lock lever 3 is rounded and the shift lever 1 includes a guide 7 having a groove formed, at an angle with respect to the longitudinal direction of shift lever 1, in a shift block 9 integrally formed with shift lever 1 along the direction of the second straight movement, such that the end of driving protrusion 5 is rotatably coupled to the guide 7.

Therefore, the guide 7 substantially is moved in an arc by the second straight movement of shift lever 1, and driving protrusion 5 inserted in guide 7 rotates key lock lever 3 by the movement of guide 7 along the second straight direction.

A torsion spring 11, an elastic member providing an elastic force pulling the driving protrusion 5 of the key lock lever 3 from the shift lever 1 clockwise, is combined with key lock lever 3.

Figure 4:
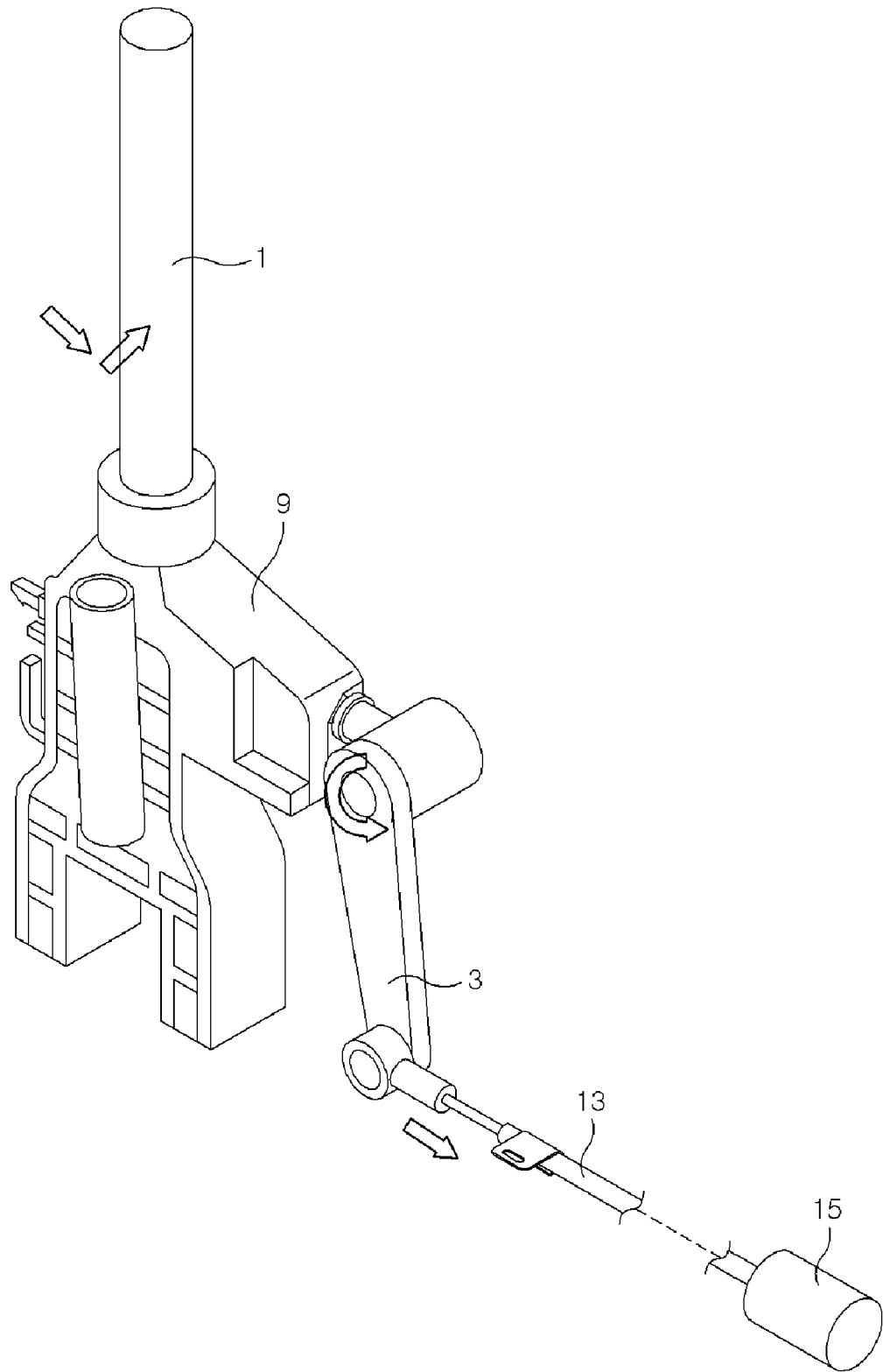
FIG. 4 is a view illustrating the exemplary operation of the present invention.

In FIG. 4, key lock lever 3 is elastically supported clockwise by torsion spring 11 along the direction of the first straight movement. While the shift lever 1 moves in the second straight movement from the position B to the P-range, the shift lever 1 rotates counterclockwise key lock lever 3 against the elastic force of torsion spring 11.

Although a motion transmitting member connected to key lock lever 3 is exemplified by a cable 13 that can transmit a pushing force to key set 15, a rod or a plurality of links can be used instead.

Key set 15, which is known in the art, has the mechanism that allows the key to be removed from key set 15 by the straight motion transmitted by key lock lever 3 when shift lever 1 moves straight from the position B to the P-range, and allows shift lever to move from the P-range to the position B, with cable 13 pulled by torsion spring 11, only when the key inserted in key set 15 is turned to ON.

According to the key interlock device for a vehicle having the above configuration, as the driver moves shift lever 1 from the position A to the position B, driving protrusion 5 is inserted into guide 7, and then as shown in FIG. 4, as the driver moves shift lever from the position B to the P-range, driving protrusion 5 is rotated by guide to rotate key lock lever 3, such that cable 13 is pushed to key set 15.

According to key set 15, the key can be removed from key set 15 by the straight motion of cable 13, and when the key is inserted and turned to ON, with cable 13 pushed, cable 13 is released and returned by the force of torsion spring 11, such that shift lever 1 is moved out of the P-range.

The key interlock device for a vehicle of the present invention, as described above, provides high operational reliability at a relatively low cost, using the mechanical operational mechanism of shift lever 1, key lock lever 3, and cable 13.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:
1. A key interlock device for a vehicle, comprising:
a shift lever moving straight at least in two perpendicular directions between a predetermined range and a P-range in sequence;
a shift block affixed to the shift lever, wherein a guide is formed to the shift block;
a key lock lever pivotally coupled to a vehicle body and rotatable by a second straight movement of the shift lever between the predetermined range and the P-range; and
a motion transmitting member coupled to an end portion of the key lock lever and transmitting the rotation of the key lock lever to a key set as a straight motion while the other end portion of the key lock lever moves in the second straight movement from/to the P-range of the shift lever by the shift lever;
wherein the key lock lever has a rotational axis disposed in parallel with the direction of the second straight movement;
wherein a driving protrusion formed on the other end portion of the key lock lever protrudes toward the shift lever along the direction of a first straight movement of the shift lever;
wherein the guide of the shift block is selectively coupled to the driving protrusion when the shift lever moves in the first straight movement and the guide of the shift block is continuously coupled to the driving protrusion when the shift lever moves in the second straight movement, the directions of the first and second straight movements being perpendicular each other;
wherein an end portion of the driving protrusion of the key lock lever is rounded;
wherein the guide of the shift lever is shaped of a groove formed to the shift block at an angle with respect to a longitudinal direction of the shift lever in the second straight movement such that the end portion of the driving protrusion is inserted into and rotatably coupled to the groove of the shift lever, the shift block being integrally formed with the shift lever;

wherein an elastic member providing an elastic force pulling the driving protrusion of the key lock lever from the shift lever is provided with the key lock lever; and wherein the motion transmitting member is a cable transmitting a pushing force actuated by the rotation of the key lock lever to the key set when the shift lever moves along the direction of the second straight movement.

* * * * *